United States Patent

[11] 3,573,649

[72] Inventor Gerald W. West
Seattle, Wash.
[21] Appl. No. 789,728
[22] Filed Jan. 8, 1969
[45] Patented Apr. 6, 1971
[73] Assignee The United States of America as represented by the Secretary of the Navy

[54] FREQUENCY-LOCK CIRCUIT
5 Claims, 2 Drawing Figs.

[52] U.S. Cl. .......... 331/14, 331/17, 331/27, 332/19
[51] Int. Cl. .......... H03b 3/04
[50] Field of Search .......... 331/14, 17, 27; 332/19

[56] References Cited
UNITED STATES PATENTS

| | | | |
|---|---|---|---|
| 2,774,872 | 12/1956 | Howson .......... | 331/27 |
| 2,968,769 | 1/1961 | Johnson et al. .......... | 331/14 |
| 3,500,225 | 3/1970 | Rogers et al. .......... | 331/27 |

*Primary Examiner*—John Kominski
*Attorneys*—Louis A. Miller, Louis B. Applebaum and Philip Schneider

ABSTRACT: A circuit for locking the frequency of an oscillator to that of a received signal. The latter is amplified, clipped and differentiated before being fed to a phase-lock loop comprising, in series, a phase comparator, low-pass filter, gating means, memory means and a voltage-controlled oscillator (VCO). The output of the VCO is fed back through a frequency divider to the phase comparator. The comparator produces a symmetrical output when the circuit input and output frequencies are equal and an unsymmetrical output when the frequencies differ. The unsymmetrical output provides a DC level when filtered, which is used to control the VCO frequency to bring it back to the input frequency after frequency division. The output of the frequency divider is also the output of the frequency-lock circuit.

INVENTOR
GERALD W. WEST
BY Philip Schneider
Louis B. Applebaum
ATTORNEYS

FREQUENCY-LOCK CIRCUIT

The invention described herein may be manufactured and used by or for the Government of the United States of America for governmental purposes without the payment of any royalties thereon or therefor.

This invention relates to a frequency-reproducing means and especially to a circuit for providing a stable output signal which is locked to the frequency of its input signal and persists for a predetermined time after the input signal ceases.

It is often useful in sonar detection and in the training of sonar operators to be able to hold the frequency of the incoming sonar signal. It is also useful to provide a means for elongating a simulated sonar echo, thereby improving the realistic qualities of an artificial echo. Circuits previously used for these purposes employed mechanical recording devices such as tape recorders to serve as signal memories. These have frequency and bandwidth limitations as well as high maintenance and poor reliability disadvantages.

An object of this invention is to provide a signal which is locked to the frequency of an input signal.

Another object is to provide means for "remembering" the frequency of an input signal.

A further object is to provide means for elongating an input signal of the sonar type.

The objects and advantages of the present invention are accomplished by means of a phase-lock loop employing a sawtooth phase comparator which provides a symmetrical output when its input and output signal frequencies have one specific phase difference, e.g., 180°, and an unsymmetrical output when the phase difference is anything else. The comparator output is filtered to provide a DC output proportional to the dissymmetry.

The DC output level controls the frequency of a voltage-controlled oscillator whose frequency-divided output is fed back to the phase comparator for phase comparison with the input signal frequency.

Other objects, advantages and novel features of the invention will become apparent from the following detailed description of the invention when considered in conjunction with the accompanying drawings wherein.

Figures 1, 2:
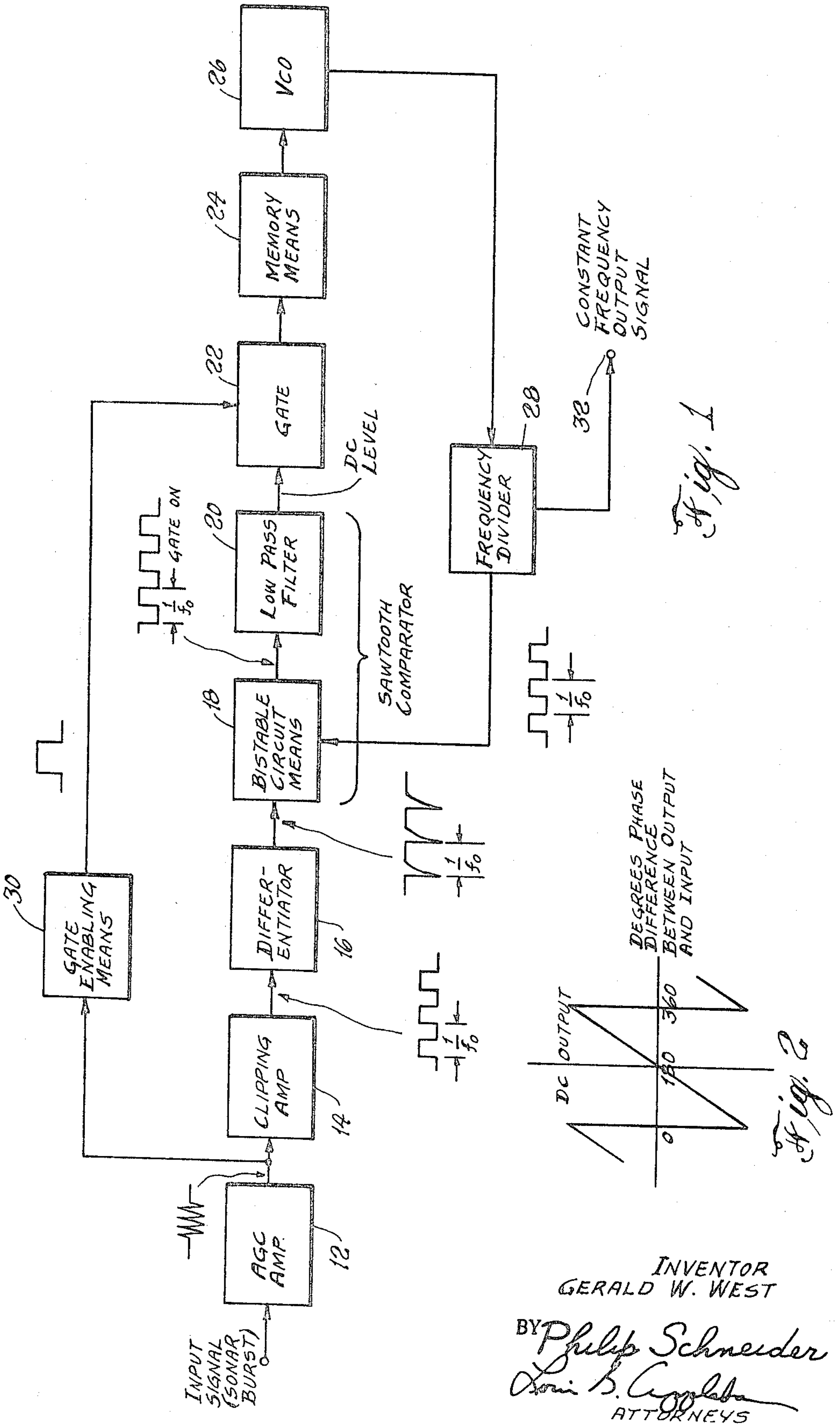
FIG. 1 is a block diagram of the circuit of an embodiment of the invention.
FIG. 2 is a plot of an idealized characteristic of the sawtooth comparator.

FIG. 1 shows an embodiment of the invention in which an input signal, a sonar burst for example, is fed through an AGC (automatic gain control) amplifier 12 to a clipping amplifier 14. The AGC amplifier 12 is used to vary the gain in accordance with the total signal present and especially in accordance with the noise so that the noise level at the input of the clipping amplifier 14 remains substantially constant.

The output of the clipping amplifier 14 is applied to a differentiator 16. The spike output of the latter is fed to a bistable circuit means 18. The output of which is a rectangular wave which is symmetrical when there is a 180° phase difference between the input signals to the sawtooth comparator. If a different phase difference exists, the rectangular wave will not be symmetrical, that is, lower-level value of each cycle will last longer than the upper-level value, or vice versa, depending on the phase difference between the input signals. The bistable circuit 18 may comprise a set-reset flip-flop circuit, for example.

The output of the bistable circuit 18 is passed through a low-pass filter 20 the output of which is a DC signal whose amplitude is proportional to the amount of dissymmetry in the output of the bistable circuit 18 or, in other words, to the amount of phase difference in the inputs to the sawtooth comparator 18. The output is zero for a symmetrical wave input.

The bistable circuit 18 and the low-pass filter 20 comprise a phase comparator and may be termed a sawtooth comparator. The term "sawtooth" here refers to the DC output level of the sawtooth comparator as a function of the input-to-output phase difference as indicated by the phased difference between the two inputs to the bistable circuit 18. As this phase difference shifts from 0 to 360°, the comparator output shifts from one extreme through some zero point at 180° to the opposite extreme (see FIG. 2). At this point, there is a discontinuity, the output shifting rapidly back to the 0° level, and the cycle starts again (hence the term "sawtooth").

The DC output level of the low-pass filter 22 is fed through a gate 22 to a memory means 22, which may comprise a capacitor, for example. The gate 24 is opened by a pulse from the gate enabling means 30, a pulse generator producing pulses whose durations are equal to the durations of the incoming sonar bursts. The gate enabling means 30 may also be designed to produce a gating pulse which is longer than the duration of the sonar bursts. This provides a ringing effect typical of the echo received from a sonar target having appreciable length.

The voltage level at the output of the memory means controls the output frequency of a voltage-controlled oscillator VCO 26 which may, for example, comprise a monostable flip-flop circuit. The output of the VCO 26 is fed into a frequency divider 28 which provides an output frequency equal to that of the input sonar signal when the phase difference between the input and output signals of the phase-lock loop is zero. The output of the frequency divider 28 is also fed to the circuit output terminal 32.

The circuit locks on to a given frequency input in a short time, about 1 millisecond on average. When the input sonar burst ends, the gate 22 bars the filter output from the memory means 24. The VCO 26 then drifts at a very slow rate from the frequency at which it was last set.

Obviously many modifications and variations of the present invention are possible in the light of the above teachings. It is therefore to be understood that within the scope of the appended claims the invention may be practiced otherwise than as specifically described.

I claim:

1. A frequency-lock circuit for locking the frequency of its output signal to the frequency of its input signal, comprising, in combination:
   - input-signal processing means for providing an output signal whose frequency has a predetermined relation to the frequency of the input signal; and
   - phase-lock loop means for providing an output signal identical in frequency to the frequency of its input signal, one input to said phase-lock loop means being the output signal of said input-signal processing means, said phase-lock loop means comprising;
     - phase comparison means having an output signal with a parameter whose value is proportional to the frequency of its input signal,
     - memory means for storing the input signal of said phase comparison means,
     - gating means for allowing the output signal of said phase comparison means to be fed to said memory means during a predetermined interval, and
     - oscillator means for providing an output signal whose frequency is controlled by the value of the output signal of said memory means, the frequency of the output of the oscillator means being the same as the input frequency to said frequency-lock circuit when the output of said phase comparison circuit is zero, the output of said oscillator means being fed back to said phase comparison circuit as an input and being taken as the output of said frequency-lock circuit.

2. A circuit as set forth in claim 1, wherein phase comparison circuit comprises a sawtooth comparator.

3. A circuit as set forth in claim 1, wherein said input signal processing means comprises:
   - an automatic-gain-control amplifier to which the input signal is applied;
   - a clipping amplifier for clipping the output signal of said automatic-gain-control amplifier; and
   - a differentiator for differentiating the output signal of said clipping amplifier, the output of said differentiator being fed as an input signal to said phase comparison means.

4. A circuit as set forth in claim 1, wherein said oscillator means comprises:

a voltage-controlled oscillator connected to receive as an input the output of said gating means; and a frequency divider for dividing the frequency of the oscillator output signal by a predetermined amount.

5. A circuit as set forth in claim 1, wherein said gating means comprises:

a gate circuit; and gate-enabling means for producing a gating signal for opening and closing said gate circuit as a switch, the duration of the gating signal being controlled by the duration of the input signal to said frequency-lock circuit.